(12) United States Patent
Greeson

(10) Patent No.: US 10,271,518 B2
(45) Date of Patent: Apr. 30, 2019

(54) SENSING MAT FOR AN ANIMAL TREATMENT SYSTEM

(71) Applicant: John S Greeson, Tulane, CA (US)

(72) Inventor: John S Greeson, Tulane, CA (US)

(*) Notice: Subject to any disclaimer, the term of this patent is extended or adjusted under 35 U.S.C. 154(b) by 0 days.

(21) Appl. No.: 16/056,814

(22) Filed: Aug. 7, 2018

(65) Prior Publication Data

US 2018/0343831 A1 Dec. 6, 2018

Related U.S. Application Data

(63) Continuation-in-part of application No. 14/157,741, filed on Jan. 17, 2014, now abandoned.

(51) Int. Cl.
*A01K 13/00* (2006.01)
*G05B 15/02* (2006.01)

(52) U.S. Cl.
CPC .......... *A01K 13/003* (2013.01); *A01K 13/001* (2013.01); *G05B 15/02* (2013.01)

(58) Field of Classification Search
CPC .. A01K 13/001; A01K 13/003; A01K 45/002; A01K 1/0082; A01K 27/007; A01J 7/025
See application file for complete search history.

(56) References Cited

U.S. PATENT DOCUMENTS

| | | | |
|---|---|---|---|
| 1,767,560 A | 6/1930 | Snyder | |
| 2,870,478 A | 1/1959 | Schuster | |
| 3,173,402 A | 3/1965 | Cassel | |
| 3,292,185 A | 12/1966 | Lucian | |
| 3,496,914 A | 2/1970 | Cowan | |
| 3,602,199 A | 8/1971 | Diggs | |
| 3,699,928 A | 10/1972 | Cowan | |
| 3,734,057 A | 5/1973 | Lee et al. | |
| 3,884,192 A | 5/1975 | Knapp | |
| 4,782,792 A | 11/1988 | Anthony et al. | |
| 5,063,880 A | 11/1991 | Bouthillier | |
| 5,630,379 A | 5/1997 | Gerk | |
| 5,656,801 A | 8/1997 | Goren et al. | |
| 5,830,379 A | 11/1998 | Tunzi | |
| 5,988,113 A | 11/1999 | Zhioua et al. | |
| 6,029,610 A | 2/2000 | Ramsey et al. | |
| 6,230,660 B1 | 5/2001 | Greeson | |
| 6,520,118 B2 | 2/2003 | Swiegers et al. | |
| 6,563,059 B2 | 5/2003 | Lee | |
| 6,615,769 B2 | 9/2003 | Zhioua | |
| 6,651,589 B2 | 11/2003 | Greeson | |
| 6,739,286 B2 | 5/2004 | Vander Veen | |
| 6,779,489 B2 | 8/2004 | Greeson | |
| 6,886,210 B2 | 5/2005 | Dean | |

(Continued)

*Primary Examiner* — Monica L Williams
*Assistant Examiner* — Michael A. Fabula
(74) *Attorney, Agent, or Firm* — Dennis F. Armijo; Jeffrey D. Myers

(57) ABSTRACT

A system that incorporates spraying logic onto a sensor mat to detect and apply various liquids onto the feet of an animal. Each sensor in the sensor mat actuates at least one predetermined spray nozzle application of the medicinal fluid. The system is designed so that each hoof triggers at least two sensors, with each sensor activating at least one spray nozzle. All of the electronic components are located away from the mat and a controller control spraying and timing. Stop bars prevent the mat from compressing beyond a predetermined distance to prevent sensor failure. The sensors have a triple moisture prevention configuration.

9 Claims, 11 Drawing Sheets

(56) References Cited

U.S. PATENT DOCUMENTS

| | | |
|---|---|---|
| 6,966,276 B2 | 11/2005 | Dollar |
| 7,194,980 B2 | 3/2007 | Greeson |
| 7,258,079 B2 | 8/2007 | Foster et al. |
| 8,276,545 B2 | 10/2012 | Greeson |
| 2002/0193346 A1 | 12/2002 | Greeson et al. |
| 2005/0005872 A1 | 1/2005 | Greeson |
| 2006/0236487 A1 | 10/2006 | Dean |
| 2007/0041593 A1 | 2/2007 | Marinovich |
| 2007/0074672 A1 | 4/2007 | Torgerson et al. |
| 2007/0256362 A1 | 11/2007 | Hansen |
| 2008/0121189 A1 | 5/2008 | Greeson |
| 2009/0013802 A1 | 1/2009 | Orlewski |
| 2011/0120385 A1 | 5/2011 | Jones |
| 2012/0174872 A1 | 7/2012 | Richards |

SENSING MAT FOR AN ANIMAL TREATMENT SYSTEM

RELATED APPLICATION

This application is a continuation-in-part of U.S. patent application Ser. No. 14/157,741, filed Jan. 17, 2014, which claimed the benefit of U.S. Provisional Application No. 61/761,889, filed Feb. 7, 2013, the specifications of which are incorporated herein by reference.

BACKGROUND OF THE INVENTION

Field of the Invention (Technical Field)

The presently claimed invention relates to treatment of animals and more particularly to a mat system and method for automatically providing treatment fluids to hoofed animals.

Background Art

Control and management of insects and other pests on domesticated animals has proven challenging, costly, often elusive, and frequently ineffective. Pests among dairy herds dramatically affect the economics of animal production and milk production, a commercial industry constituting a significant contribution to the gross national product of the United States. The dairy cattle industry estimates a produce of $38 billion annually. Failure to deal with pests can cause a number of problems, including irritations to cows so severe that milk production suffers, disease pathogens transmit from cow to cow, and a variety of regulatory rules and requisitions are violated for failure to treat such pests. The presently claimed invention has provided exemplary solutions for solving problems arising from pests among dairy herds as shown in U.S. Pat. No. 6,230,660 issued May 15, 2001; U.S. Pat. No. 6,651,589 issued Nov. 25, 2003, 2001, U.S. Pat. No. 6,779,489 issued Aug. 24, 2004; and U.S. Pat. No. 7,194,980 B2; issued Mar. 27, 2007, (collectively, "Prior Applications and Patents").

The problems solved by the Prior Applications and Patents include a wide range of diseases, infections, and injuries to the feet and other anatomical regions of animals and mammals, including cattle that are part of dairy herds. In addition to treating diseases, infections and injuries on the feet of dairy cows, it is useful to apply various ingredients for preventative treatment to achieve resistance to diseases and lacerations, to harden hooves to resist physical injury, and to achieve similar and related objectives. Livestock in a dairy herd are susceptible to forming a variety of warts, abscesses, sole ulcers, foot rot, heel cracks, and variations of lesions or infections on their feet and/or hooves. These problems individually or collectively case livestock to suffer lameness, clubbed hooves, loss of body weight, decreased milk production, and a decreased rate of conception. In the presently claimed invention, the term "animal treatment problems" includes these problems, but is not limited in any way.

U.S. patent application Ser. No. 11/458,935 for an ANIMAL FOOT TREATMENT SYSTEM filed Jul. 20, 2006, and U.S. Publication No. US/20008/0121189 A1 published on May 29, 2008, present exemplary solutions to such problems.

U.S. Pat. No. 8,276,545 B2, for ANIMAL FOOT TREATMENT, issued Oct. 2, 2012, presents another solution; however, this system is complex and requires several external components to provide control for the efficient application of the medicinal fluid to the location of each hoof. The present application presents significant improvements to this prior art patent, minimizing the complex electronics, and simplifying the sensor mat.

Alternative apparatuses and methods suggested as solutions for application of ingredients to animals are potentially hazardous both to humans and to animals. For example, a common way to apply topical solutions to hooves of animals is a form of bath, footbath, tub, or container (in this document, "bath") through which an animal walks. Concentrations of ingredients in baths used for chemical treatment of animal foot problems render ineffective results because debris deposited in the ingredients in the form of animal waste passes through the bath. Accordingly, to ensure continued efficacy of a bath, baths must be cleaned regularly and refilled with fresh ingredients. Unfortunately, the cleaning and refilling of baths is generally a manual chore often ignored. After a short period, this results in an inefficacious bath. Therefore, until development of the system shown in the presently claimed invention, applying and maintaining precise concentrations of ingredients has proven problematic.

Bath application methods are comparatively expensive and inefficient; therefore, in an effort to achieve appropriate coverage and treatment, excessive quantities of expensive chemicals and chemical combinations are incorporated. Debris deposited in the bath acts to reduce the efficacy of the footbath solution. As more animals pass through the bath, the debris deposited continually degrades, rendering the bath contents inefficacious. Therefore, to compensate for this effect, the chemical concentration in the bath must be at sufficient strength to insure that the contents of the bath will still be efficacious when the last animal traverses the bath. Thus, the concentration of the solution in the bath must be much stronger than required for the first animal passing through the bath to be effective enough for the last animal passing through the bath because of the degrading effect of continuous debris deposition.

Baths in which animals place their feet may also cause pollution and injury to animals and/or humans. For example, copper sulfate commonly used in treating cows and the discharge of copper sulfate from bath treatment systems into adjacent lands may cause significant damage to croplands, and is not sustainable because the legal limit for discharge cannot exceed a determined parts per million. Another chemical used extensively in the dairy industry is formaldehyde, which cases burns to humans and animals, and can result in the loss of eyesight and even death among workers. For these reasons, the European Union has called for a ban of the use of formaldehyde, a decision made more compelling because the United States recognizes it as a known carcinogen. Formaldehyde in comparatively large concentrations in a bath application system may damage the feet of cattle. Use of the animal treatment system disclosed in the presently claimed invention eliminates those problems and others associated with contamination, pollution, and injury caused by excessive concentrations of one or more chemicals in a footbath system. At the same time, it decreases the costs of effective applications of ingredients.

For example, studies show that the animal treatment system disclosed in the presently claimed invention may reduce the quantities of expensive chemicals. The result is a significant reduction in the use of costly chemicals, potential pollution, and accompanying costs.

As indicated, the animal treatment system disclosed n the presently claimed invention is capable of selective discharge and application. A consequence of selective targeting of expensive chemicals reduces the overall costs of contending with animal treatment problems. The animal treatment system of the presently claimed invention, therefore, provides flexibility by allowing use of precise ingredients to treat a precise problem.

Another problem with the prior art methods of treatment is that all of the animals are treated equally during any treatment cycle. However, certain animals may require more frequent treatments due to certain or more severe conditions. Thus, a system to apply treatment to predetermined animals more frequently than others is necessary.

One example, among many, is the treatment of digital dermatitis also known in the dairy industry as hairy heel warts. Over 90% of the time digital dermatitis generally occurs on the back of a cow's rear feet, and can occur between the cow's toes ad/or claws and on front feet as well. In the present application, due to the animal treatment system's ability to selectively target specific anatomical regions of a cow for treatment, studies have shown that chemical usage, as a result of this animal treatment system, can be reduced by 70%-90%. For treating digital dermatitis, the animal treatment system of the presently claimed invention appears to be at least four times more efficient to use than any other known footbath or bath treatment system.

Yet another advantage of the animal treatment system of the presently claimed invention is treatment of varying conditions of an anatomical region during varying cycles of an animal treatment regime. In a dairy herd environment, the hooves of cows changes solidity in direct relationship to the lactation cycle of the cow. The term "lactation cycle" refers to the period during when the mammary glands of a cow produce milk. A cow entering a lactation cycle may not have had foot treatment for the 2-4 month "dry period" before calving and not being milked, and therefore was not passing through the footbath. During that period, a cow's foot may become softer than it was during the lactation cycle when routinely passing through a bath. Softness may later result in development of significant abscesses, ulcers, or erosions that will ultimately have to be treated. Additionally, because cows are typically not exposed to baths during the "dry period", certain foot lesions of diseases become more pronounced. Use of the animal treatment system of the presently claimed invention allows changes in chemical compositions of applications of ingredients to reflect such varying problems, which are unique to the dairy industry.

The system, apparatuses, and methods disclosed, illustrated, and claimed in the previously filed patient applications by the Applicant have proven useful for the intended purposes and applications described in that document. However, the present disclosure provides significant improvements to the actuating and delivery methods and systems. The prior art systems work well in providing the treatment but the mat structure tended to wear out and fatigue after repeated use. In addition, the presently claimed system is significantly more effective in controlling and spraying specific hooves. The presently claimed system prevents malfunctions due to the harsh conditions that the mat system has to operate in and continues to operate effectively if there is a failure of parts of the system.

Therefore, there is need for a system that prevents these conditions. The drawing figures, additional contributions to the art disclosed, illustrated, and claimed in the presently claimed invention provide other optimizations and embodiments in which the principles of operation, with different configurations, result in additional features and uses. Consequently, additional advantages of the animal treatment system disclosed, illustrated, and claimed in the presently claimed invention will become evident. None of the currently available suggestions for addressing animal treatment problems is as effective as the suggestions disclosed in the presently claimed invention.

It is apparent that a need exists in the industry for a new and useful system to treat animal feet and/or hooves that is capable of applying precise amounts of ingredients, at precise times, and during precise lengths of time. The applied treatment is for selected anatomical regions of animals to achieve a cost-effective and treatment-effective application of these ingredients to overcome animal treatment problems. Further, there is a need for the system to avoid unnecessary complexities in the system. Additionally, to improve blood flow in the hooves of animals that prevents or reduces swelling in their feet, the presently claimed invention discloses and improved chemical compound.

SUMMARY OF THE INVENTION
(DISCLOSURE OF THE INVENTION)

The presently claimed invention solves the aforementioned problems and provides several improvements to the prior art systems. First, a chemical is presented that improves blood flow in the hooves of animals to prevent or reduce the swelling in their feet. Secondly, a simplified hoof treatment system is implemented to make it practical and less expensive to manufacture. This system does not require expensive electronic devices on the footpad or mat and relies on the properties of the footpad construction for activation of the spray regime. Most of the electronic devices are located away from the footpad and the harsh conditions therein. Additionally, the footpad with the activation switches has a triple moisture prevention configuration to prevent activation switch failures due to the immersion of the mats to harsh chemicals and other liquids. This includes outer rim compression with bonding adhesives, double encapsulation of each switch or sensor in a flexible waterproof liner, and switch material made from stainless steel springs to prevent corrosion. Further, if a failure does occur, the system preferably has software or firmware logic that detects the failure and compensates by using adjacent spray nozzles, or the like, so a failure does not stop the flow of animals entering the mat system for treatment.

Additionally, the mat structure has been improved by stop bars on either side of each pressure sensor to limit the distance of compression on the pressure sensors. These stop bars also distribute the lateral forces applied to that section of the mat again to prevent damage to the mat by the extreme pressures exerted by the hoofed animal. In the preferred embodiment, a plunger comprised of a rubber material is selected with an optimal rigidity and compressibility to activate the pressure sensors while maintaining the integrity of the mat. When downward pressure is exerted on the plunger, this provides a downward force to press against the top contact, that ultimately makes contact with the bottom contact. This operates essentially as a switch, activating the specific spray nozzles that and related to the pressure sensor. The switches or pressure sensors are spaced apart at a predetermined distance so that a single hoof depresses and activates at least two switches or sensors, thus, activating more than one spray nozzle aimed at the specific hoof. Preferably each switch or sensor activates one spray nozzle towards the front of the hoof and one spray nozzle sprays toward the rear of the hoof, so in the preferred embodiment, four spray nozzles are activated with each depression of the specific hoof. The switches are connected either by wire or wirelessly to remotely located valves and a controller for specific purposes such as activating, deactivating, timing, and other functions for spraying the specific chemical compound on specific hoofs and locations on each hoof. Finally, a method and system are presented to treat only selected animals so that the entire herd does not need to be treated or to provide specific treatment to specific animals with specific conditions.

Other objects, advantages, novel features, and further scope of applicability of the presently claimed invention will be set forth in part in the detailed description to follow. The description is used in conjunction with the accompanying drawings, and in part will become apparent to those skilled in the art upon examination of the following, or may be learned by practice of the claimed invention. The objects and advantages of the claimed invention may be realized and attained by means of the instrumentations and combinations particularly pointed out in the appended claims.

BRIEF DESCRIPTION OF THE DRAWINGS

The accompanying drawings, incorporated herein form a part of the specification, illustrate several embodiments of the presently claimed invention, and together with the description, serve to explain the principles of the invention. The drawings are only for the purpose of illustrating a preferred embodiment of the invention and should not be construed as limiting the invention.

In the drawings.

DESCRIPTION OF THE PREFERRED EMBODIMENTS

Best Modes for Carrying Out the Invention

Logical Sensor Mat for Appling Liquids

As used in this disclosure, the term "foot" means not only the terminal part of a vertebrate animal's leg, but also the hoof, the pad, the pastern, the dewclaw, the hock, and the portion below the knee or hock on an animal such as a domestic bovine. Although the examples discussed in this disclosure are limited to dairy cows, the claimed invention includes treatment of any type of animal.

Figure 1A:
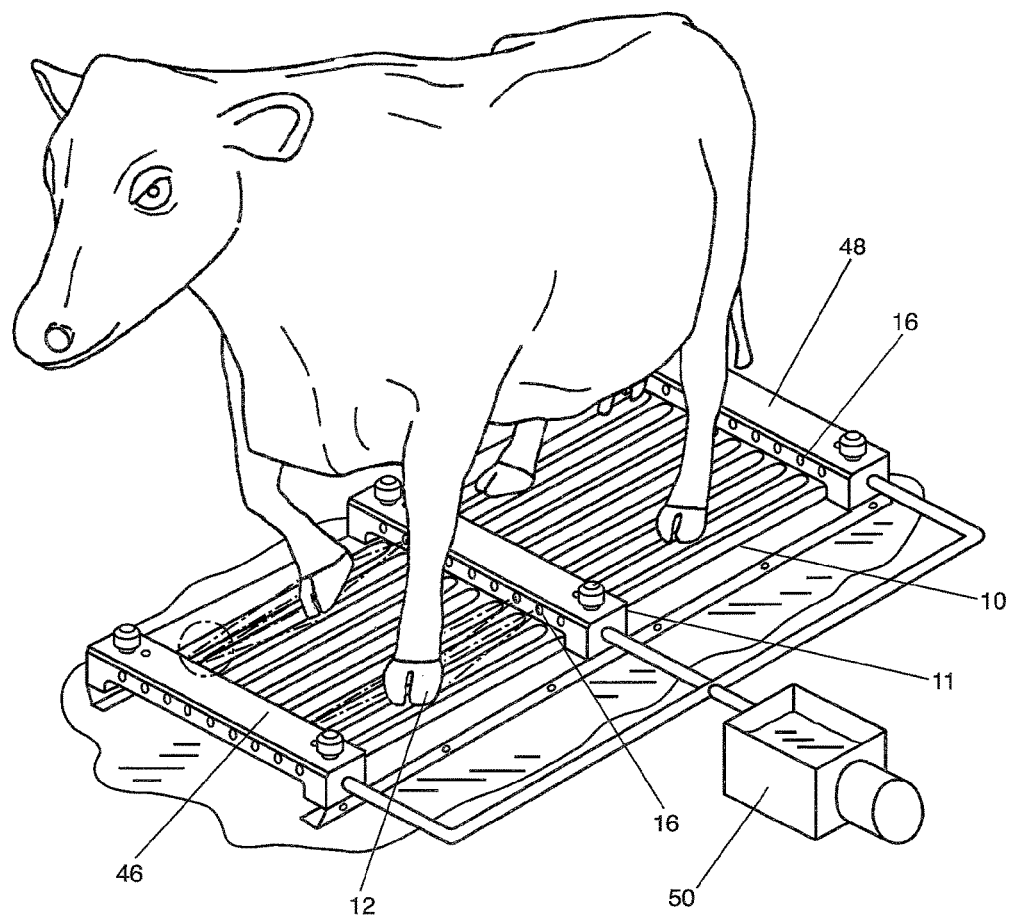
FIG. 1A shows a first embodiment of the animal treatment system.
Figure 1B:
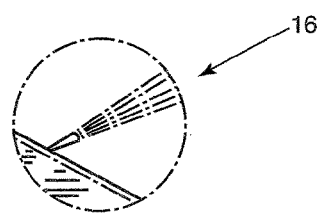
FIG. 1B shows a blow up of a spray nozzle.
Figure 4:
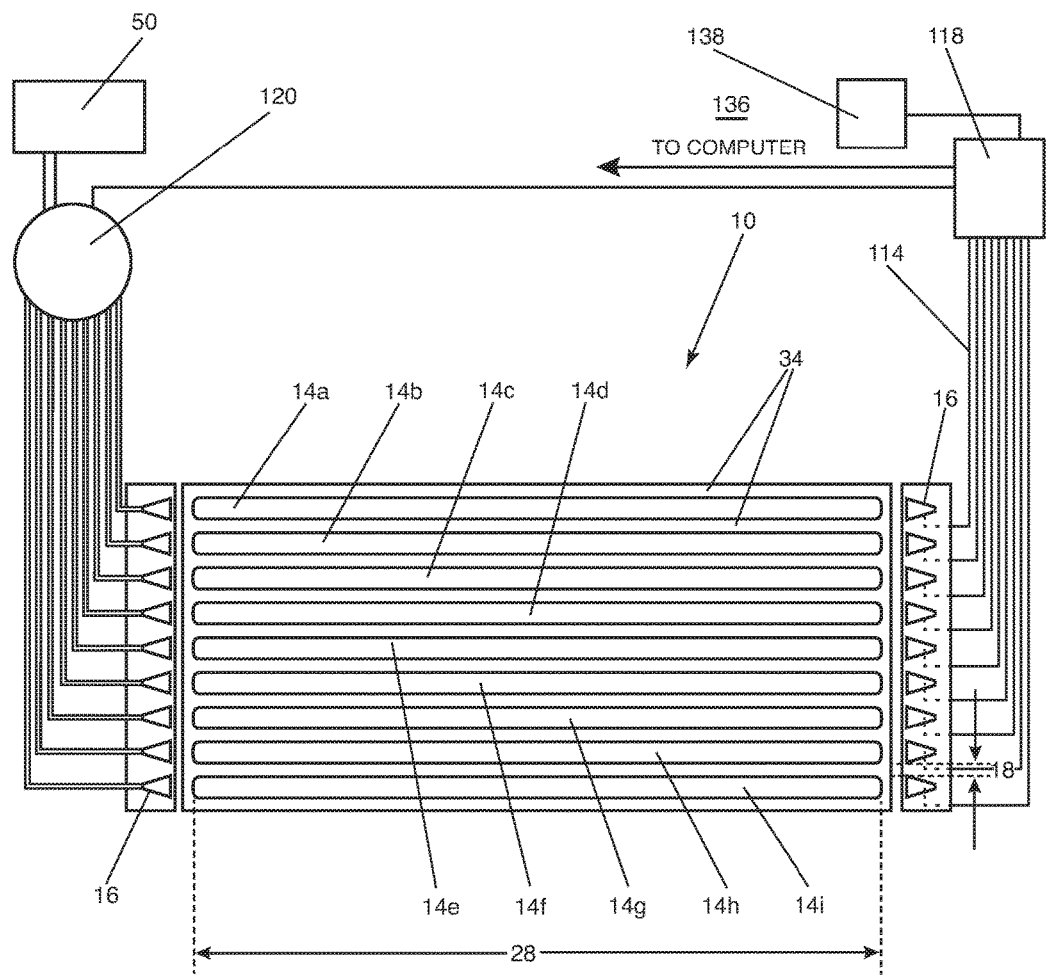
FIG. 4 shows a second embodiment of the preferred mat.
Figure 5:
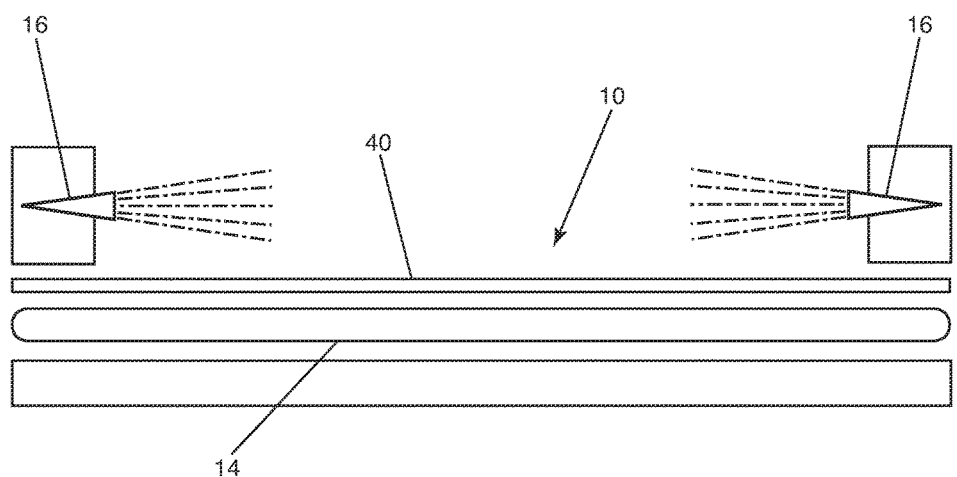
FIG. 5 shows an exploded view of the preferred mat system.

FIG. 1 shows a first embodiment of a typical system installation. In this embodiment a center section 11 separates the front portion of the mat from the rear portion of mat. Spray nozzles 16 are located in front spray manifold 46, both front and rear of center section 11, and rear spray manifold 48, as shown. Liquid holding reservoir 50 is connected to front spray manifold 46, center section 11, and rear spray manifold 48 to provide the liquid sprayed onto hooves 12. FIG. 4 is a second embodiment of the mat system; however, it does not have center section 11 of FIG. 1. Both of these embodiments operate similarly. In mat 10, the compression of the foot or hoof 12 activates sensors 14 (14a-14i) by depression and limits the depression by load bearing bars and whereas pressure sensors 14 (14a-14i) and spray nozzles 16 are placed at the correct spacing and angle to provide the spray coverage necessary.

Figure 2A:
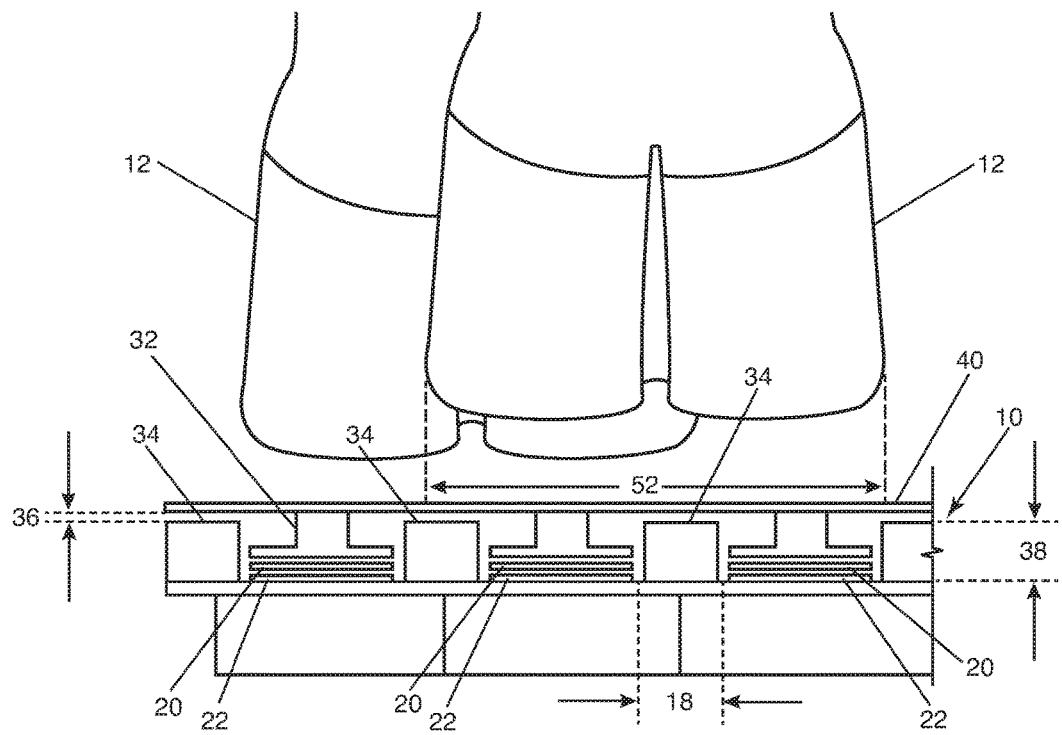
FIG. 2A shows a portion of the mat without hoof compression.
Figure 2B:
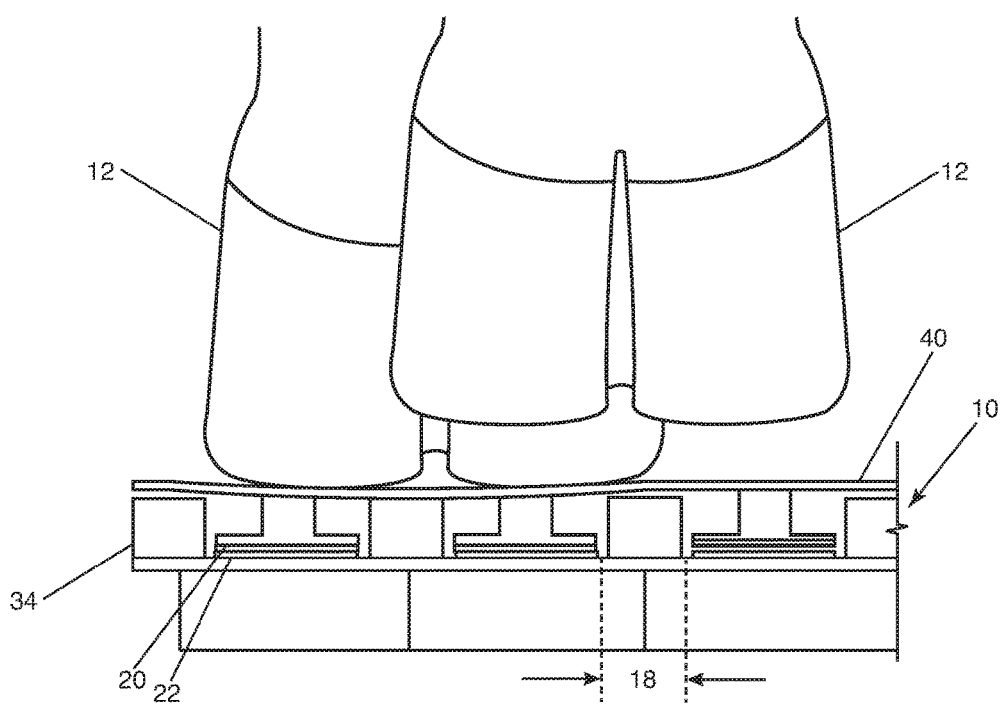
FIG. 2B shows a portion of the mat with hoof compression.
Figure 3:
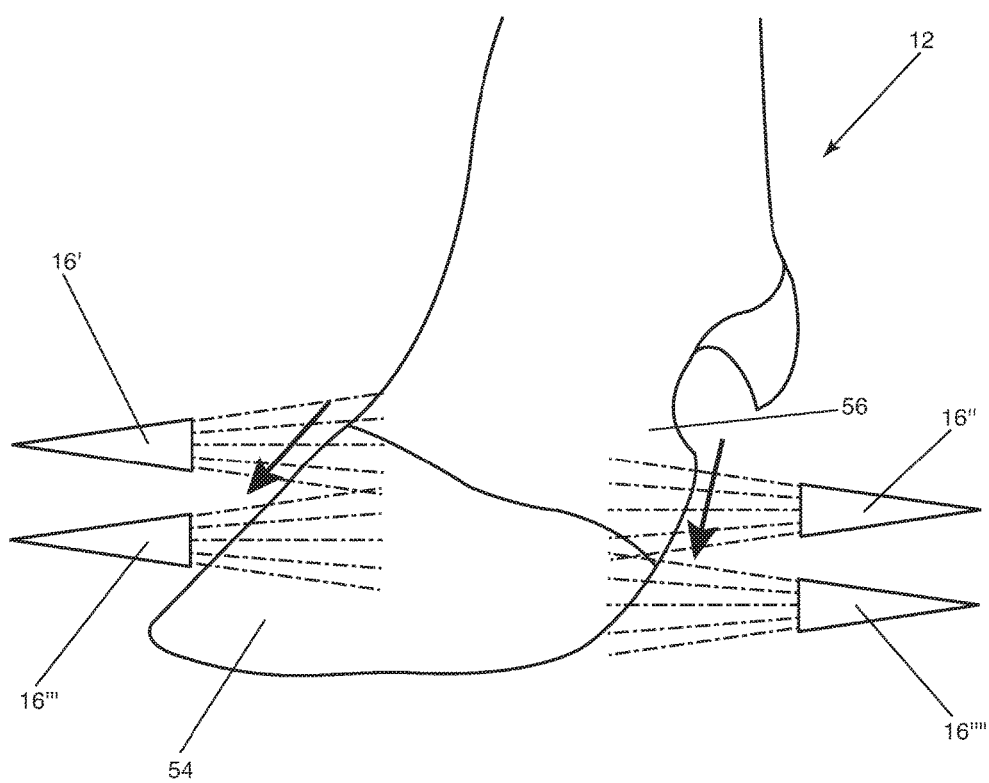
FIG. 3 shows the preferred spray pattern and location on a hoof.
Figure 6A:
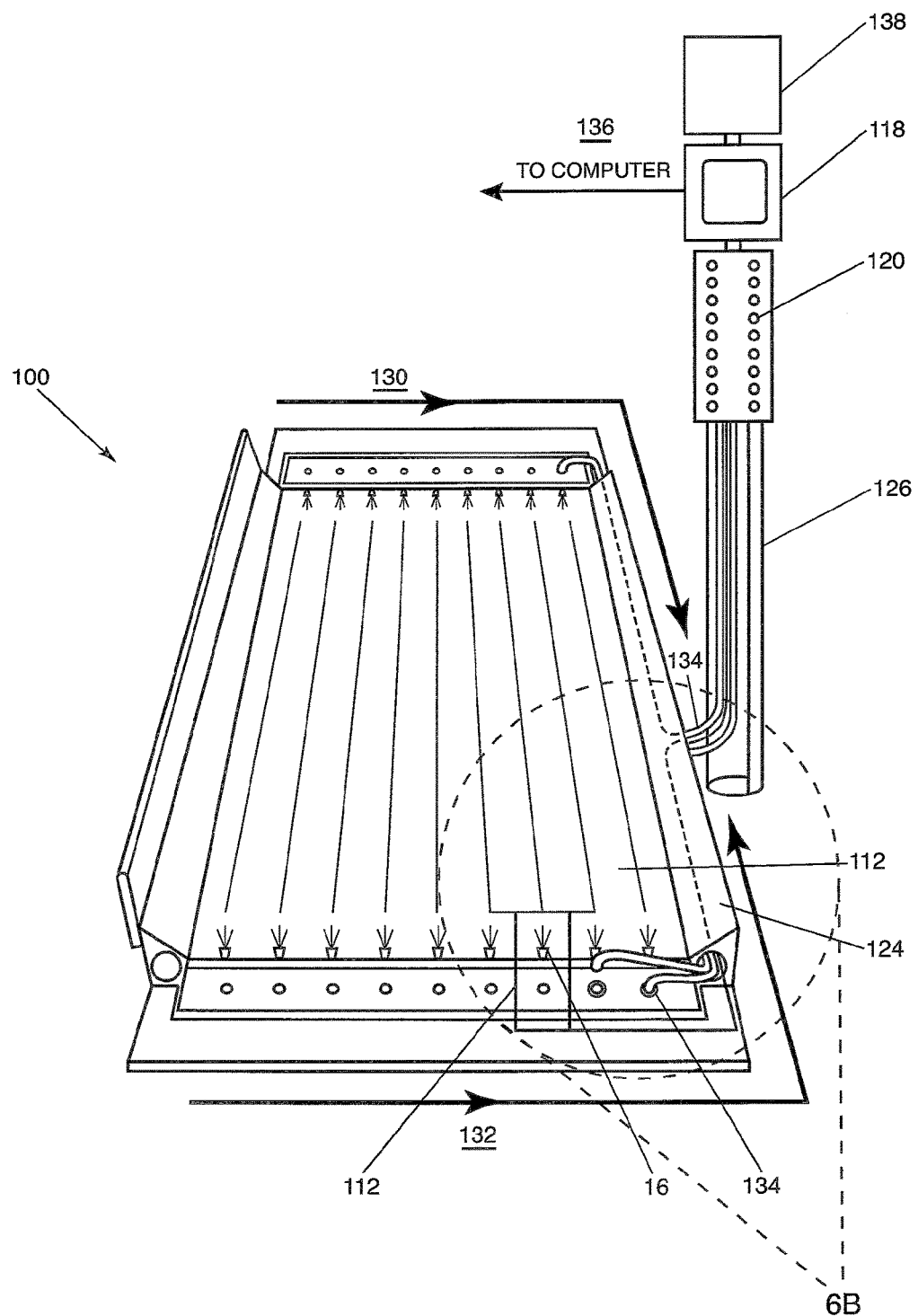
FIG. 6A shows a perspective view of the mat system of FIG. 4.

Mat 10 as shown in the figures is configured for dairy cows. In the preferred embodiment, plunger 32, comprising a rubber material, is selected with an optimal rigidity and compressibility to activate pressure sensors 14 (14a-14i) while maintaining the integrity of the mat. When downward pressure is exerted on plunger 32, this provides downward force to press against top contact 20 that ultimately makes contact with bottom contact 22, as shown in FIGS. 2A and 2B. In this embodiment, mat 10 has nine (9) pressure sensors, 14a through 14i, as shown in FIGS. 4 and 6A. Each pressure sensor 14 (14a-14i) runs along the length of mat 10, as shown. Spacing 18 between each mat is optimized preferably so that each hoof 12 comprising width 52 compresses at least two pressure sensors. Pressure sensors 14 (14a-14i) essentially are switches, that when depressed by a weight bearing hoof 12, establishes contact between top contact plate 20 and bottom contact plate 22 that in turn activates corresponding spray nozzles 16. Each pressure sensor 14 (14a-14i) is configured to activate at least two spray nozzles, a first nozzle 16' aimed towards the front of the hoof 54, and a second nozzle 16" aimed at the rear of the hoof 56. Thus, when hoof 12 with width 52 depresses at least two pressure sensors 14 (14a-14i), at least four spray nozzles 16 are activated, spraying the specific hoof 12 with two nozzles 16' and 16''' aimed at the front of hoof 54 and two nozzles 16" and 16"" aimed at the rear of hoof 56 as shown in FIG. 3.

The elasticity or compressibility of the material for plunger 32 should be optimized for the weight bearing or force exerted upon it. For example, a full-grown male bovine can weigh up to 3000 pounds and have a vertical jump of 3 feet or more landing with a force of over 20,000 psi. In the first embodiment and second embodiment as shown in FIGS. 1 and 4, a thickness and type of compressible material for plunger 32 needs to be selected based on these criteria. Attached to top contact plate 20 and bottom contact plate 22 can be valve assemblies for allowing the flow of the treatment liquid to hoof 12. Once the downward force is removed when the animal steps off pressure sensor 14 (14a-14i), the contact is opened and the spray is stopped.

Figure 6B:
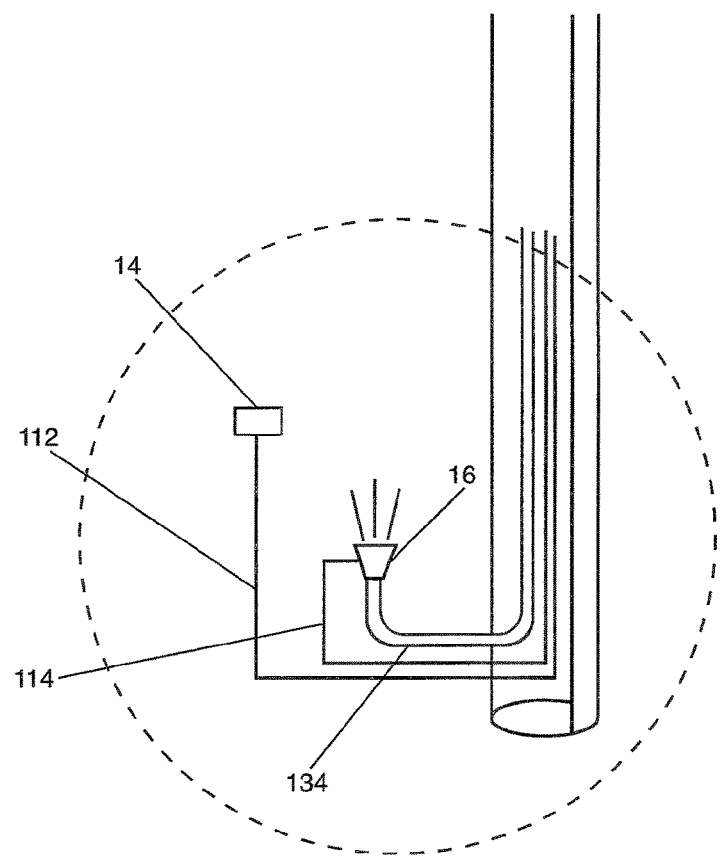
FIG. 6B shows a close up of the tubing and electrical wiring of the mat system of FIG. 6A.

In a second embodiment as shown in FIGS. 4, 6A, and 6B, the active electronic components are located away from the caustic, liquid fluids in the mat system. Shown in FIGS. 4 and 6A are the preferred mat system. FIG. 4 is for illustrative purposes only to show the configuration of the wiring and tubing connections. Typically all of the wiring and tubing are configured to run on a single side of the footpad 130, 132. Wiring to pressure sensors 112 run within raceway 124 up half pipe 126 to junction box 118. Spray nozzle wires 114 also run within raceway 124 up half pipe 126 to junction box 118. Tubing 134 for carrying liquids for spraying are affixed to nozzles 16 and also run within raceway 124 up half pipe 126 to valve box 120. Junction box 118 can be hard wired or wirelessly connected to controller 136, such as a computer. Junction box 118 supplies AC current to pressure sensors 14 (14a-14i) via wiring to pressure sensors 112 to detect whether contact has been made between plates 20 and 22. Once contact has been detected, controller 136 initiates predetermined valves related to predetermined pressure sensors 14 (14a-14i) (as described above) open to allow fluid to flow to specific spray nozzles 16.

A timer 138 can also be utilized to turn on and/or turn off the spray, if desired. The controller can also operate as a timer. A delay in activating and deactivating the spar nozzles are included due to the compression properties of the elastomers. In the alternative, instead of the sensors described above, load cells can be utilized to detect pressure of the animal's foot and to activate the spray regime as discussed above. Alternative embodiments can include the placement of laser, ultra-sonic, photo electric, sensors parallel at a predetermined spacing to allow position of the hoof to be determined and sprayed. Other types of sensors can also be used such as vibration sensors, tube pressure sensors, or tube flow sensors.

Another feature in the presently claimed invention are load bearing or stop bars 34 that are disposed next to each side of each pressure sensor 14 (14a-14i), running along length of sensor 28. Stop bars 34 are designed to prevent contraction of pressure sensors beyond a predetermined distance 36, no matter the amount of downward pressure that is applied. Stop bars 34 prevent damage to pressure sensors 14 (14a-14i) and lessen the amount of compressible material required to protect firm flexible tube 134 (if necessary), top 20, and bottom contact plates 22. Height of stop bars 38 should correspond to the distance required for achieving contact between the top contact plate 20 and bottom contact plate 22, hereinafter predetermined distance 36. Stop bars 34 are preferably constructed from any type of rigid material, again depending on the force exerted by the animals being treated.

Preferably, a top cover 40 is disposed on top of all pressure sensors 14 (14a-14i), as shown, for additional protection of pressure sensors 14 (14a-14i), which keeps debris and moisture away from pressure sensors 14 (14a-14i). Top cover can be constructed from a compressible or highly elastic material, such as rubber. By using a compressible material for top cover 40, the thickness of plunger 32 can be lessened.

Additionally, footpad or mat 10, 100, with the activation switches or pressure sensors 14 (14a-14i) has to prevent failure of activation switch 14 (14a-14i) due to the immersion of the mats to harsh chemicals and other liquids. This includes outer rim compression with bonding adhesives, double encapsulation of each switch or sensor 14 (14a-14i) in flexible a waterproof liner, and switch material made from stainless spring steel, such as 300 grade stainless steel, to prevent corrosion.

Another feature that is disclosed is to connect controller 136, that can pick up failed sensors and patch spray patterns, and output AC current to the switches to avoid corrosion, and then pick up an analog signal so that a threshold can be determined to detect a short caused by water. An example of a mat system that detects and provides protocols for corrective action is provided below. Controller 136 converts 24 v DC to 3.2 AC volts with analog inputs. Thus, dry switch contacts 20, 22, typically register 0 volts. Flooded or wet switch contacts 20, 22, typically register 1.1-1.8 volts. Software or firmware adjusts the "float" to call no contact up to 0.4 volts. So even if the switch is flooded, a metal to metal contact registers 3.1-3.2 Volts. By using AC, corrosion is not induced and avoids corrosion of the switch 14 (14a-14i).

When 100 cows walk over mat 10, 100, each sensor 14 (14a-14i) must be activated a predetermined number of times. If it is not then the program in controller 136 considers this a failed switch. Since load bearing bars 34 limit the number of switches 14 (14a-14i) that a cow can activate, it has been determined that there must be at least two switches 14 (14a-14i) on 90% of the time and three switches on 10% of the time.

Since the system is designed so that a single hoof activates at least two sensors or switches, a method to determine if a switch failure has occurred is provided. For example, if the following configuration of sensors, both operational and not working is as follows:

1 good
2 bad
3 good
4 good
5 good
6 good
7 bad
8 bad
9 good

If a cow steps on sensors 1 14a and 2 14b and only sensor 1 14a registers, the program in controller 136 knows that sensor 2 14b should be activated as well so the program opens 2 valves to spray on nozzle s corresponding to sensor 1 14a and sensor 2 14b. In the scenario of two bad side by side sensors, sensors 8 14h and sensor 8 14i, which represent potential to miss or not see a hoof, the system would inactivate the corresponding spray nozzles. Although this second tier spray operation is not as efficient as if all of the sensors are working, this allows for continued operation of the system instead of ceasing operation for replacement or repair of the failed sensors. This system allows a sensor mat partial failure and still can operate as intended.

Figure 9:
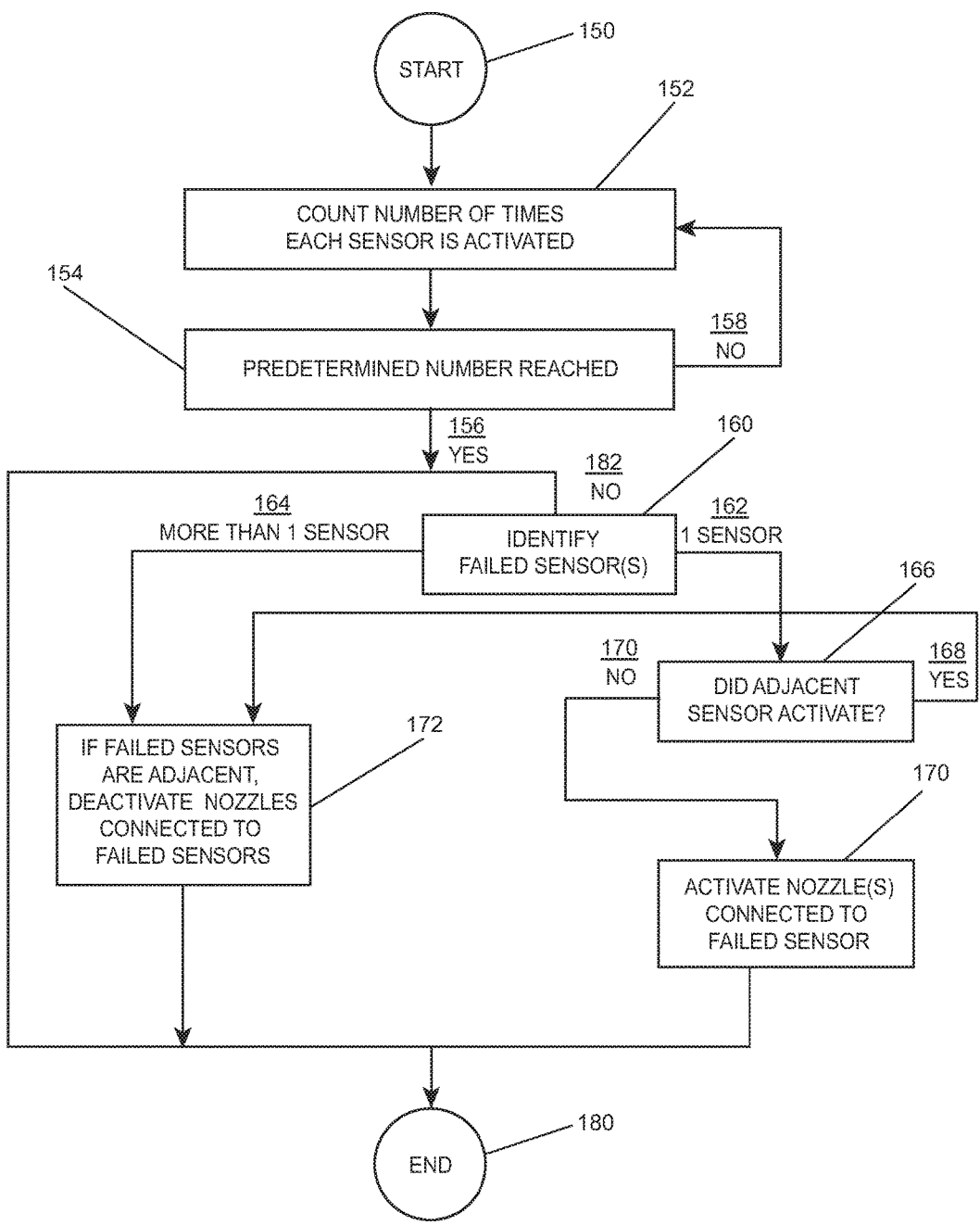
FIG. 9 is a flow chart showing the method of detecting and compensating for failed sensor(s).

The preferred method for detecting and compensating for failed sensor(s) is shown in FIG. 9, a flowchart describing the method. Initially, the method begins with a start 150. As previously indicated the system requires a predetermined number of sensor activations to set a threshold. Thus, the method provides for the computer or controller to count the number of times each sensor is activated 152. If a predetermined number of activations are reached 154, yes 156 on the flowchart, the system continues. If the predetermined number has not been reached, no 158 on the flowcharts, the system continues counting the number of activations 152. If the number is arched, yes 156, the next step is to identify any failed sensors 160. If there are no failed sensors, no 182 on the flowchart, the system continues to end 180. If one failed sensor 172 is detected, the system then determines whether if the adjacent sensor to the failed sensor activated 166. If the adjacent sensor activated 168 the nozzles connected to the failed sensor are activated 170. The system then goes to end 180. If the adjacent sensor did not activate 170, the system presumes that more than one sensor has failed so the sensors are deactivated 172 and the corresponding nozzles are deactivated. The system then goes to end 180.

Figure 7:
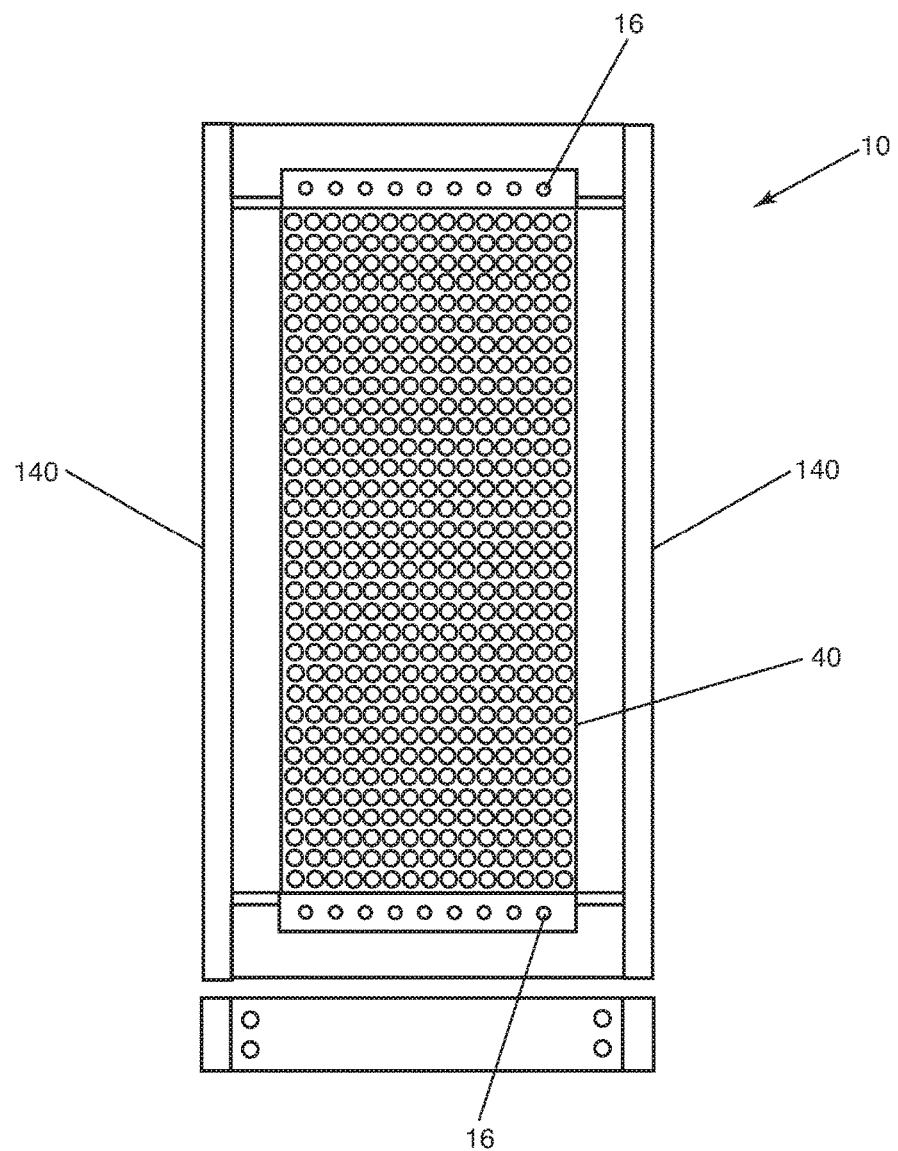
FIG. 7 shows a top view of the mat system of FIG. 4.
Figure 8:
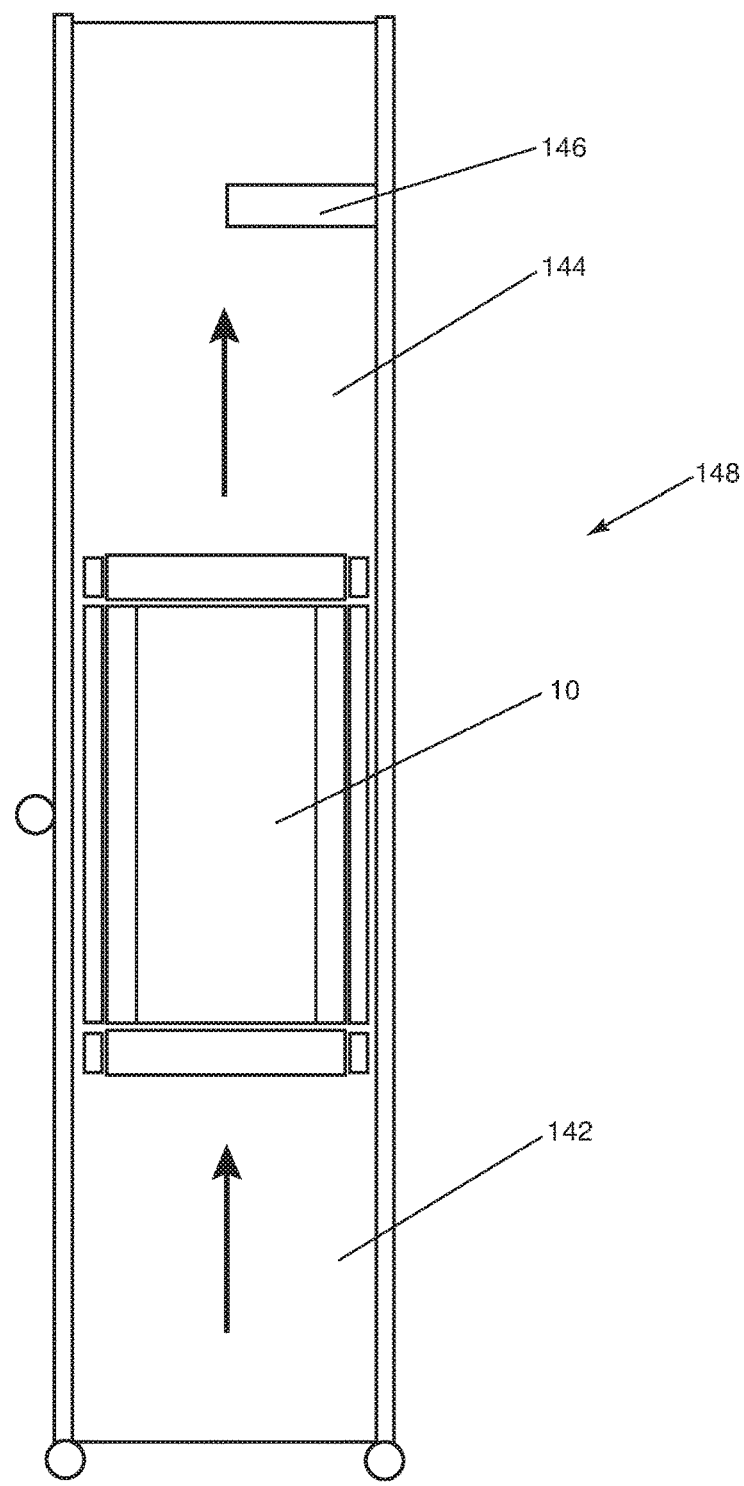
FIG. 8 shows a top view of the entire runway of the treatment system including the mat system of FIG. 4.

FIG. 7 is a top view of mat system 10. Top cover 40 protects sensors (not shown) from debris and liquids when cows traverse mat 10 for treatment by spray nozzles 16. Bumpers 140 keep the cows on mat 10 and can contain raceway as previously described. FIG. 8 shows the entire treatment system 148. Entry runway 142 is provided for entry of cows onto the system. Entry runway 142 preferably is eight foot (8') in length to allow for 2 or 3 cows before entering onto mat 10. Treatment mat 10 is typically about 8 feet in length to accommodate a single cow. One the cow is treated, it exits onto exit runway 144 which can also have a fly sprayer 146 which provides an additional fly spray treatment to each cow. Fly sprayer 146 is typically about six feet (6') from the end of treatment mat 10.

Topical Anti-Inflammatory/Vaso Dilator

During acidosis, brought on by "slug" feeding bovines, acidic levels change and trigger histamine reactions within its body, one of the points sensitive to this change are in its hooves. During those changes, capillaries reacting to histamines constrict to stop blood flow and release microphages and other white organism. This leads to swelling in a space where a stiff horn wall surface does not allow expansion. As swelling starts, the swelling leads to compression and hemorrhaging of the cells on the micro level, leading to laminitis, lameness, white line disease, abscess, and ulcers on the macro level.

It was discovered in the field that the frequent use of topical anti-inflammatory/vaso dilation could successfully prevent this condition to a large degree. Therefore, a solution of 1.5%-7.5% of magnesium sulfate in water was used in the field test. Although this disclosure discusses magnesium sulfate and a well-known anti-inflammatory solution can be used. The number of treatments applied by a hoof trimmer to correct laminitis issues to a herd of 3,200 cows was as follows:

In 2011, untreated animals required 462 surgical operations that were performed to remove large amounts of the cow's foot so that the blood and inflammation could drain and then a block was adhered to the treated foot to remove the pressure from the surgical site over a 5-month period.

In 2013, using the disclosed topical anti-inflammatory treatment in the same herd, only 237 cows required surgical operations described above for a similar 5 months period.

Thus, a difference of 48.7% between untreated cows to treated cows.

Identification for Treatment of Specific Animals

Figure 10:
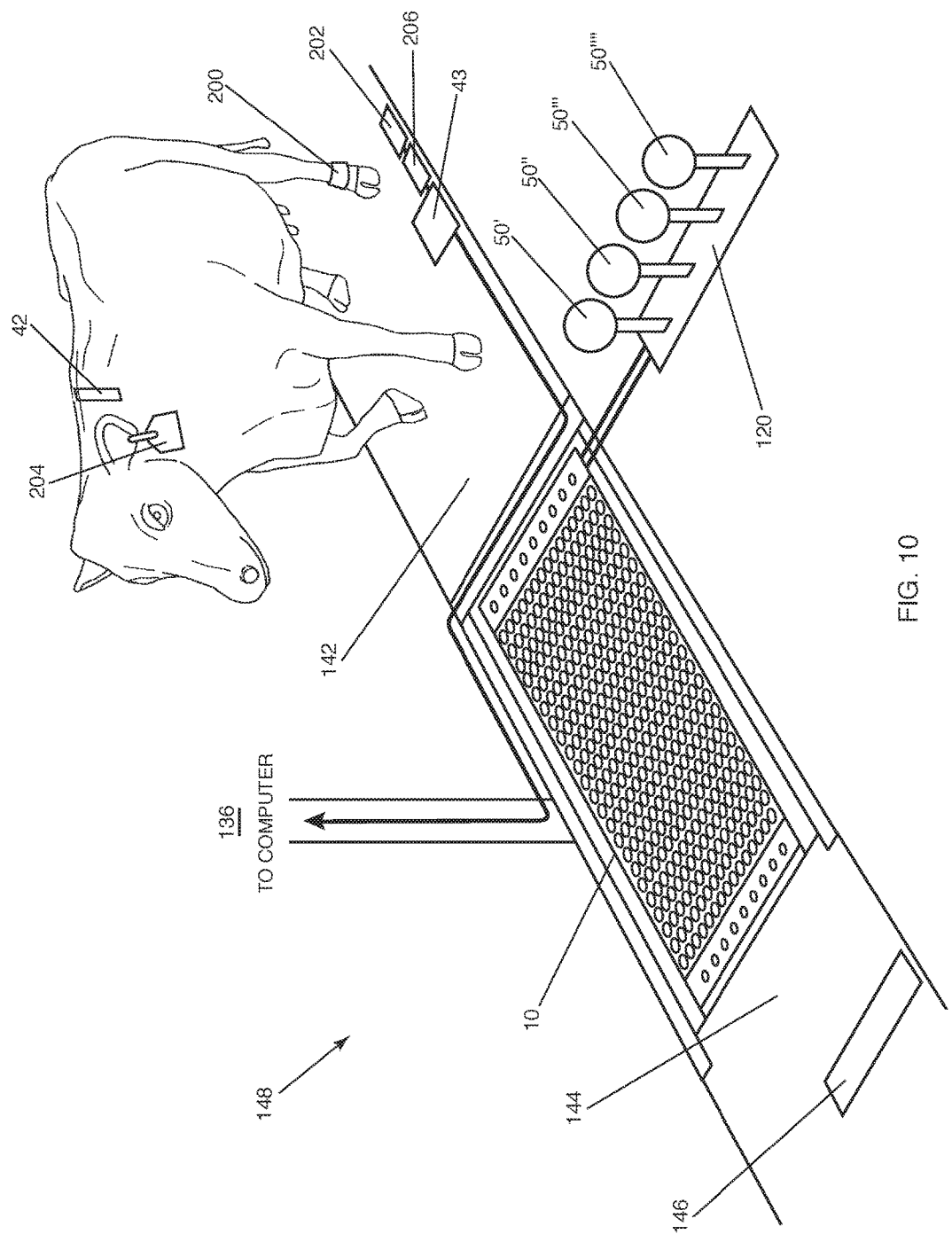
FIG. 10 shows the system for activating a specific spraying regime.

In dairy herds, there are different hoof problems that exist which only affect a small number of animals in a herd at any given time; typically, the number would be 30-100 incidents per 1,000 cows. A footbath is common for the prevention of these diseases, meaning only after the cow has a lesion of 4 mm or larger will these prevention methods be ineffective. After that, a stronger and more concentrated formula must be used to cure these diseases. Typically, these cows are introduced into the herd when they start their first lactation or during non-lactating periods, and then re-introduced into the herd. During these times, preventative hoof treatments stop and re-infection can and does occur. This system gives the producer the ability to tag or choose an animal that the system will recognize and alter its normal preventative function to an effective treatment function. This can be seen in FIG. 10. A tag 42 can be placed on an animal for this special treatment. Tag 42 can be a transmitting sensor recognized by receiver 43 causing a computer or controller to initialize the treatment system for actuation upon hoof pressure on the mat as disclosed above. Tag 42 can be a microchip using Radio Frequency Identification (RFID) or any other well-known system. The tag 42 can also be visual or audio, whereby a user can manually initiate the treatment system. The system can have a first tag embodiment, a second tag embodiment or a combination of both.

The first embodiment is a magnet on an angle band 200 or other body attachment system. This magnet force is picked up by metal detector 202 connected to computer or controller 1336 and is used to activate a specific treatment regime. There can be a plurality of holding reservoirs 50', 50'', 50''' 50'''', each containing the specific treatment liquid. Using more than one magnetic leg band 200 could offer a plurality of choices of treatment.

The second embodiment is using exiting RFID systems on ear tags 204 of the cows or the like. When ear tag 204 is read by detector 206 it is checked by computer 136 to determine if that specific cow needs treatment and what type of treatment is required. Computer 136 makes the determination and selects the valves connected to the selected holding reservoir 50 to spray the hooves that actuate the sensors as described above.

Either of these embodiments can be controlled by controller 136, which includes an application on a smart phone or a smart pad or computer.

The two alternative modes of treatment in these embodiments are for extra treatment regimens for cows with specific problems such as digital dermatitis or bacterial infections.

In an alternative embodiment is dispensing of other treatment fluids, such as a topic anti-inflammatory out of a separate manifold system so the chemicals do not mix and are ready for spraying independent of the main system for the treatment of laminitis.

Another benefit of this treatment on dairy animals is stress that can induce worse problems such as laminitis, abscesses, ulcers, and white line, but can be prevented by allowing the treatment to be done without disrupting the animal's normal eating routine.

Without this system, an animal that has an infection needs to be sorted out of their pen, and placed in a pen where a hoof trimmer comes and cuts away the lesion, then applies a concentrated topical powder, and then wraps the hoof. During this time, the animal is under stress, in a strange area, with strange cows, which are seeking to establish a new social order, causing the cows to reduce feeding until the order is established. By the time this happens, the treatment has been done and the animal is moved back to their original pen, and the process repeats itself anew, to a smaller degree, setting up a situation for "slug" feeding that can lead to acidosis and the accompanying laminitis. Thus, the claimed invention provides for tagging only the animals that require treatment and applying the medicinal fluid only to these animals.

Although the claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A sensing mat for an animal treatment system comprising:
   a plurality of spray nozzles, each spray nozzle configured to spray a fluid to a specific portion of the sensing mat;
   a plurality of sensors, wherein the plurality of sensors comprise a predetermined space between a first and a next sensor so that compression by the animal's foot activates at least two sensors;

a controller configured to receive an output from the at least two activated sensors and to send a signal to activate more than one predetermined spray nozzle; and a plurality of rigid load bearing bars running a length of the sensing mat on each side of each sensor;

each of the rigid load bearing bars acting as a stop to prevent contraction of sensors beyond a predetermined distance; and to distribute the lateral forces applied to a section of the mat, wherein each of rigid load bearing bars comprises a predetermined height that corresponds to a travel distance required for activating each of the sensors.

2. The sensing mat of claim 1 further comprising a compressible elastomer disposed on each sensor.

3. The sensing mat of claim 2 wherein the flexible elastomer is disposed between a contact surface of the sensing mat and each sensor for limitation of excessive pressure on each sensor.

4. The sensing mat of claim 1 wherein each sensor comprises a load cell.

5. The sensing mat of claim 1 further comprising a delay apparatus for the activation and deactivation of an output of each sensor.

6. The sensing mat of claim 1 wherein each load bearing bar further comprises a predetermined width.

7. The sensing mat of claim 1 comprising a protective covering for a plurality of sensors.

8. The sensing mat of claim 1 comprising a mat cover with outer rim compression with bonding adhesives and double encapsulation of each sensor in a flexible waterproof liner.

9. The sensing mat of claim 1 wherein each sensor comprises a contact material of stainless spring steel.

* * * * *